(12) United States Patent
Kurts

(10) Patent No.: US 6,209,053 B1
(45) Date of Patent: Mar. 27, 2001

(54) METHOD AND APPARATUS FOR OPERATING AN ADAPTIVE MULTIPLEXED ADDRESS AND DATA BUS WITHIN A COMPUTER SYSTEM

(75) Inventor: Tsvika Kurts, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/141,970

(22) Filed: Aug. 28, 1998

(51) Int. Cl.$^7$ ....................................... G06F 13/36
(52) U.S. Cl. ................ 710/113; 710/126; 710/129; 710/240
(58) Field of Search ................... 710/113, 117, 710/126, 129, 131, 240

(56) References Cited

U.S. PATENT DOCUMENTS

| | | | |
|---|---|---|---|
| 4,449,207 | 5/1984 | Kung et al. | 365/230 |
| 5,278,984 | * 1/1994 | Batchelor | 709/207 |
| 5,369,651 | 11/1994 | Marisetty | 371/40.1 |
| 5,404,482 | * 4/1995 | Stamm et al. | 711/145 |
| 5,455,915 | 10/1995 | Coke | 395/325 |
| 5,522,054 | * 5/1996 | Gunlock et al. | 711/112 |
| 5,535,345 | 7/1996 | Fisch et al. | 395/309 |
| 5,568,620 | 10/1996 | Sarangdhar et al. | 395/285 |
| 5,606,672 | 2/1997 | Wade | 395/308 |
| 5,627,991 | 5/1997 | Hose, Jr. et al. | 395/456 |
| 5,829,033 | * 10/1998 | Hagersten et al. | 711/141 |
| 5,875,466 | * 2/1999 | Wakerly | 711/138 |
| 5,936,960 | * 8/1999 | Stewart | 370/438 |
| 5,978,874 | * 11/1999 | Singhal et al. | 710/107 |

* cited by examiner

Primary Examiner—Ario Etienne
(74) Attorney, Agent, or Firm—Blakely, Sokoloff, Taylor & Zafman LLP

(57) ABSTRACT

An apparatus, for operating a multiplexed 128-bit external bus within a computer system, includes arbitration logic that arbitrates between contending address and data requests according to the number of outstanding data and/or snoop transactions on the external bus. In response to the outcome of this arbitration, selection logic grants the external bus to either the contending address or data request. The arbitration logic may compare the number of outstanding data transactions to a predetermined data threshold number when performing the arbitration, this data threshold number being dynamically alterable by an application program or operating system so as to optimize external bus throughput under predetermined conditions.

36 Claims, 12 Drawing Sheets

METHOD AND APPARATUS FOR OPERATING AN ADAPTIVE MULTIPLEXED ADDRESS AND DATA BUS WITHIN A COMPUTER SYSTEM

FIELD OF THE INVENTION

The present invention relates generally to the field of data transfer in a computer system and, more specifically, to a method of operating a multiplexed address and data bus within a computer system to obtain improved data throughput.

BACKGROUND OF THE INVENTION

Communications between devices within a computer system are typically performed using one or more buses that interconnect such devices. These buses may be dedicated buses coupling two devices or non-dedicated buses that are multiplexed by a number of units and devices (i.e. bus agents). Moreover, buses within a computer system may be dedicated to the transfer of a specific type of information. For example, the x86 microprocessor architecture developed by Intel Corporation of Santa Clara, California, includes a three-bus system, with address, data and control buses for respectively transferring address, data and control signals.

In computer systems employing advanced architectures and processors, such as the Pentium Pro® or Pentium II® processors, bus transactions occur in a pipelined manner. Specifically, a next memory access may start after a previous transaction request was issued and all components or phases of a bus transaction are not required to complete before another bus transaction may be initiated. Accordingly, requests from numerous bus agents may be pending at any one time. The pipelining of bus transactions is facilitated by separate data and address buses. While an address of a request is being sent on an address bus, data (or signals) corresponding to an address previously issued on the address bus may be returned on the data bus.

In order to facilitate increased data throughput, computer systems may facilitate burst data transfer, wherein an address is issued on an address bus, and data is returned from the addressed location, as well as a number of immediately subsequent locations as defined, for example, by the Intel burst order scheme. For example, during a burst cache transfer, a full line of data (e.g., 32 bytes) from a cache memory may be placed on a data bus in response to a single address placed on the address bus. In many computer systems, such burst cache transfer may account for a substantial portion activity on buses within the computer system. In these situations, it will be appreciated that the address bus is being under utilized relative to the data bus.

SUMMARY OF THE INVENTION

A method and apparatus for operating a multiplexed address and data bus within a computer system includes the step of arbitrating between an address request and a data request contending for access to the multiplexed bus. This arbitration is performed according to a predetermined criterion. The multiplexed bus is then granted to either the address or data request in accordance with the outcome of the arbitration.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for operating a multiplexed address and data bus within a computer system are described. In the following description, for purposes of explanation, numerous specific details are set forth in order to provide a thorough understanding of the present invention. It will be evident, however, to one skilled in the art that the present invention may be practiced without these specific details.

Computer System Overview

Figure 1A:
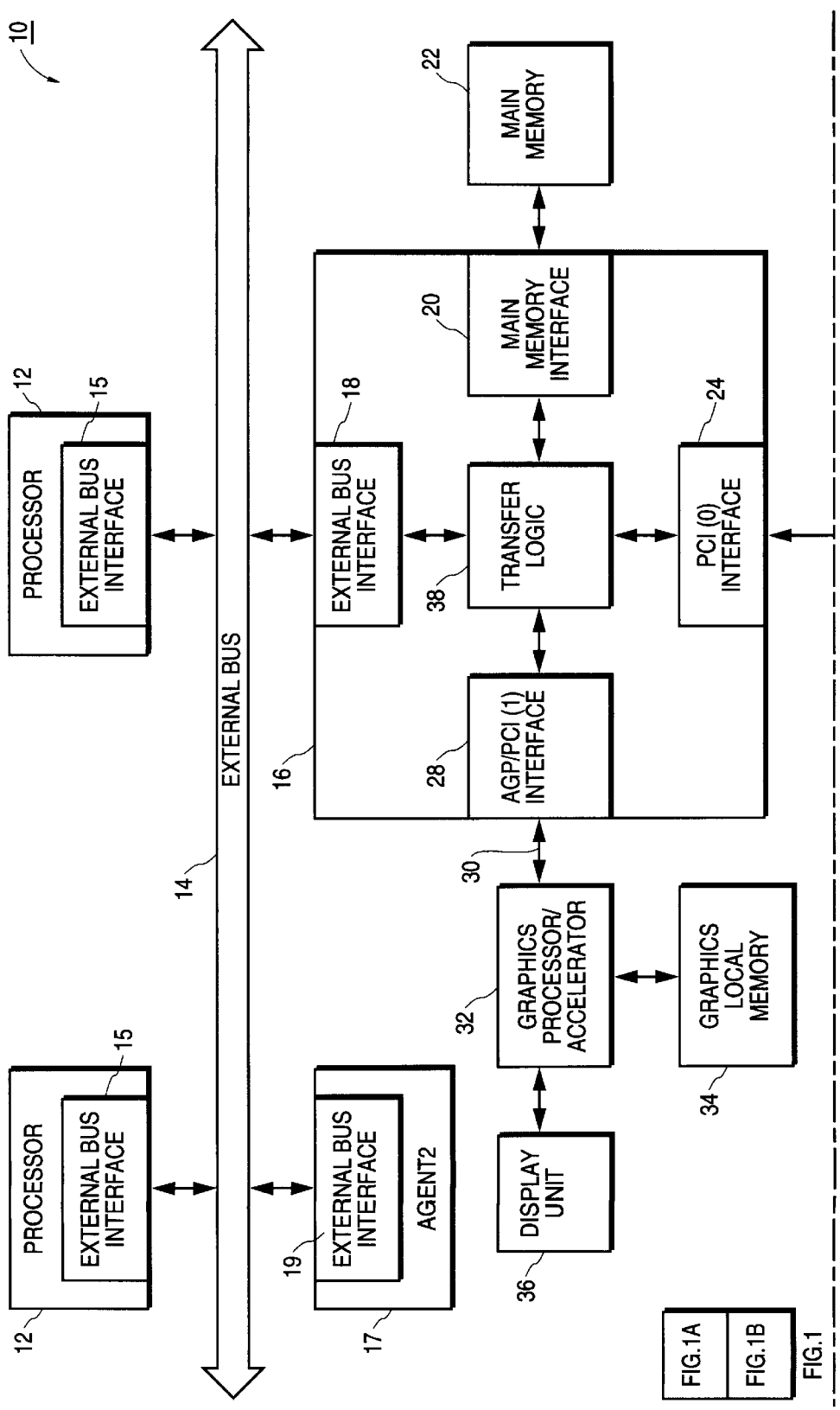
FIGS. 1A and 1B are block diagrams of a computer system within which an exemplary embodiment of the present invention may be implemented.
Figure 1B:
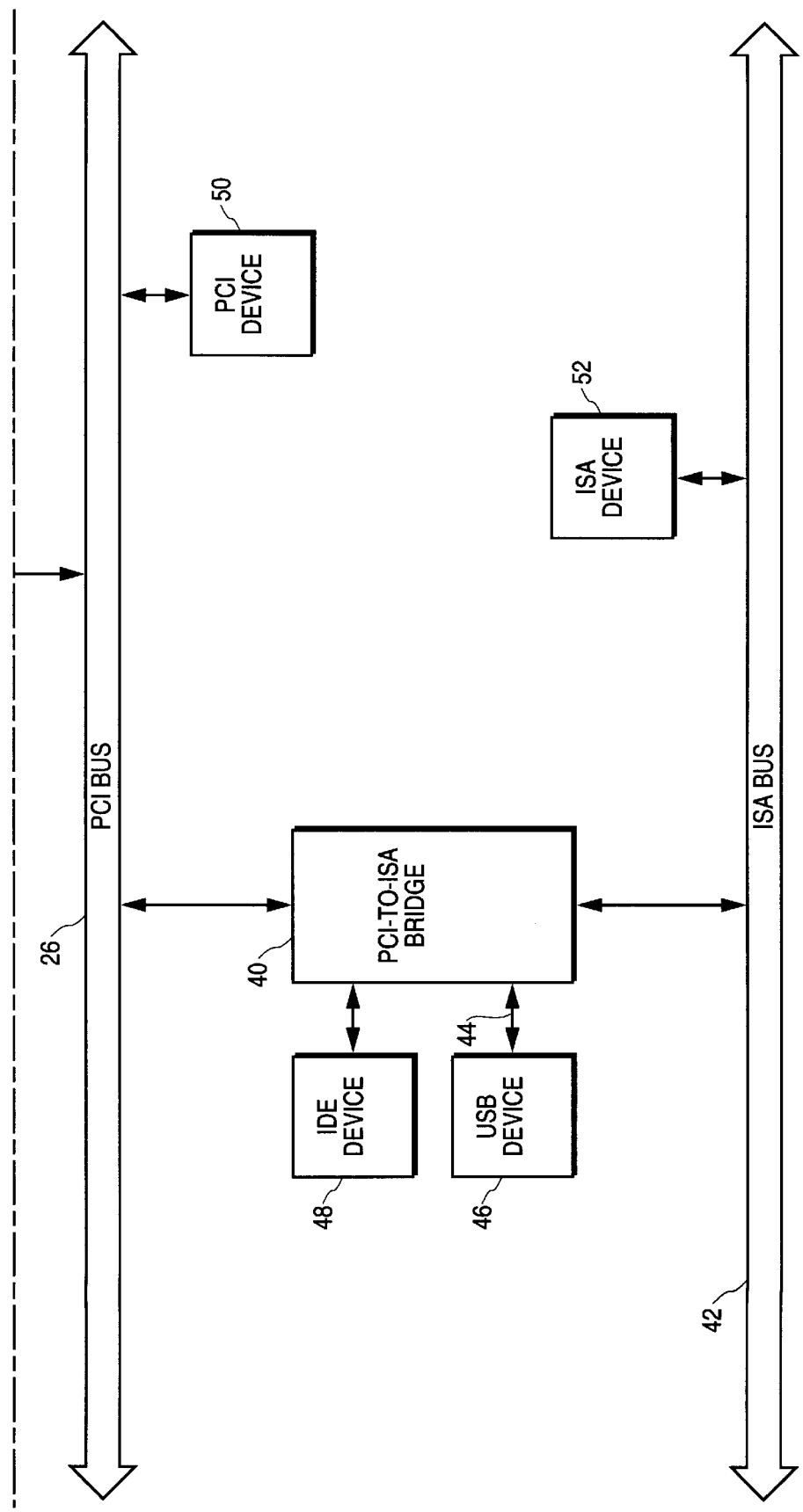

FIGS. 1A and 1B are block diagrams of a computer system 10 within which one exemplary embodiment of the present invention may be implemented. The computer system 10 includes one or more processors 12, each of which may be a Complex Instruction Search Computing (CISC) microprocessor, a Reduced Instruction Set Computing (RISC) microprocessor, a Very Long Instruction Word (VILW) microprocessor or any other processor device. In one embodiment of the invention, each of the processors 12 may be a Pentium Pro® or Pentium II® microprocessor manufactured by Intel Corporation of Santa Clara, California. Each of the processors 12 is coupled to an external bus 14 (also termed a "front side bus (FSB)") via a respective external bus interface 15. A further agent 17 including an external bus interface 19 is shown to be coupled to the external bus 14.

A controller 16 is also coupled to the external bus 14 via an external bus interface 18 included within the controller 16. The external bus 14 and the external bus interfaces 15 and 18 may operate at a first frequency (i.e. 66 or 100 MHz), and thus constitute a distinct clock domain. The controller 16 is further shown to include a main memory interface 20, by which the controller 16 is coupled to a main memory 22. The main memory 22 and the main memory interface 20 may comprise a distinct clock domain, or may be integrated within the time domain of the external bus 14 and the external bus interface 18.

The controller 16 further includes a Peripheral Components Interconnect (PCI) interface 24, as defined by the PCI Local Bus Specification Revision 2.1, published Jun. 1, 1995, by which the controller 16 is coupled to a PCI bus 26. In one embodiment, the PCI interface 24 and the PCI bus 26 operate at a frequency of 33 MHz and accordingly constitute a further distinct clock domain. A dedicated graphics interface, which in the exemplary embodiment comprises an Accelerated Graphics Port (AGP) interface 28, couples the controller 16 to a graphics bus, which in the exemplary embodiment comprises an AGP bus 30. The AGP bus 30 is exclusively for the transfer of address and data information between the controller 16 and a dedicated graphics processor 32. The AGP interface 28 functions in compliance with the AGP Interface Specification, Revision 1.0, published Aug. 1, 1996. The graphics processor 32 may comprise the Intel i740 graphics accelerator chip. The graphics processor 32 is coupled to a dedicated and local graphics memory 34, and to a display unit 36, which may comprise a computer monitor or a television set. In one exemplary embodiment, the AGP interface 28 and the AGP bus 30 operate at a frequency of 66 MHz, and accordingly constitute a further distinct clock domain.

The interfaces 18, 20, 24 and 28 of the controller 16 may each reside in a different and distinct clock domain. To facilitate the transfer of signals between the clock domains within which the various interfaces reside, the controller 16 includes transfer logic 38. The transfer logic 38 further includes circuitry for synchronizing clock signals that clock the clock domains of the external and AGP interfaces.

The computer system 10 further includes a bridge 40, which facilitates communication between the PCI bus 26 and a legacy bus 42. The legacy bus 42 may be an Industry Standard Architecture (ISA) bus, as defined by the ISA Bus Specification P996. It will be appreciated that the legacy bus 42 may alternatively be any legacy bus such as an Extended Industry Standard Architecture (EISA) bus or a Micro Channel Architecture (MCA) bus. The bridge 40 is further shown to be coupled by a Universal Serial Bus (USB) 44 to a USB device 46, both of which are compliant with the USB Specification, Revision 1.0, published Jan. 15, 1996. The bridge 40 is also shown to couple an Integrated Device Electronics (IDE) device 48, which is typically a mass storage device in the form of a disk drive, to the computer system 10. Respective PCI and ISA devices 50 and 52 are shown to be connected to the PCI and ISA buses 26 and 42. It will be appreciated that any number of PCI devices 50 and ISA devices 52 may be coupled to the relevant buses 26 and 42, and may comprise any one of a number of peripheral devices, including storage, input, audio, display or network devices.

External Bus Protocols

Figure 2:
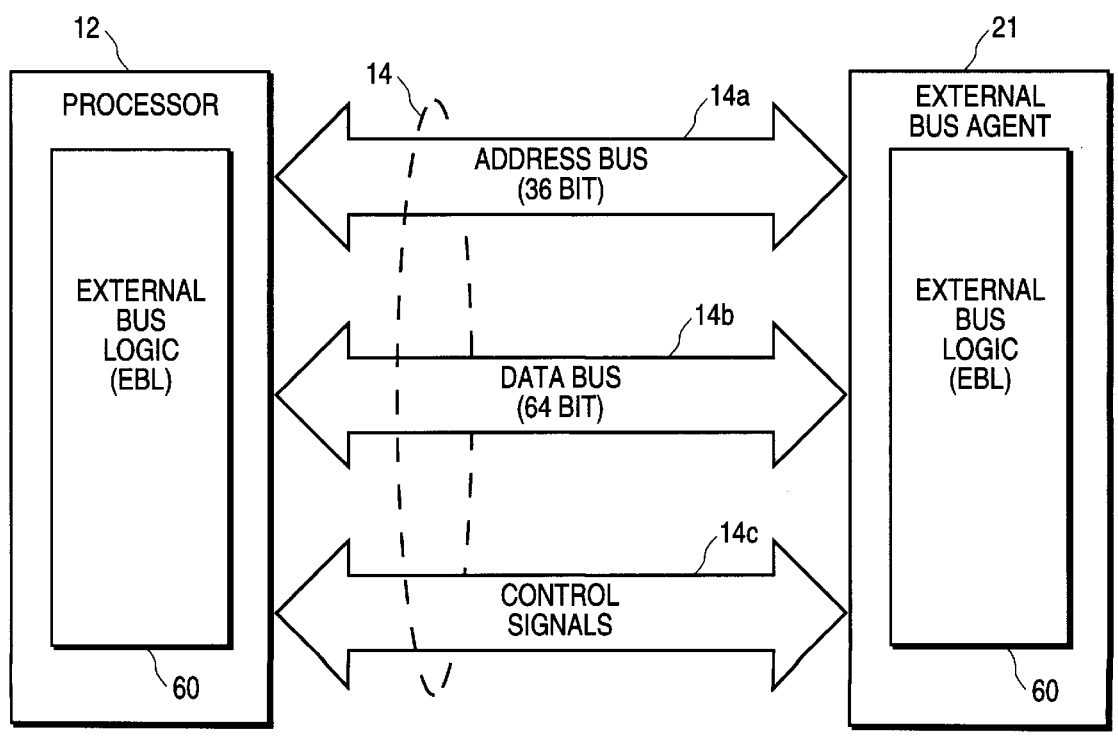
FIG. 2 is a block diagram illustrating an external bus coupling a processor and a further external bus agent.
Figure 3:
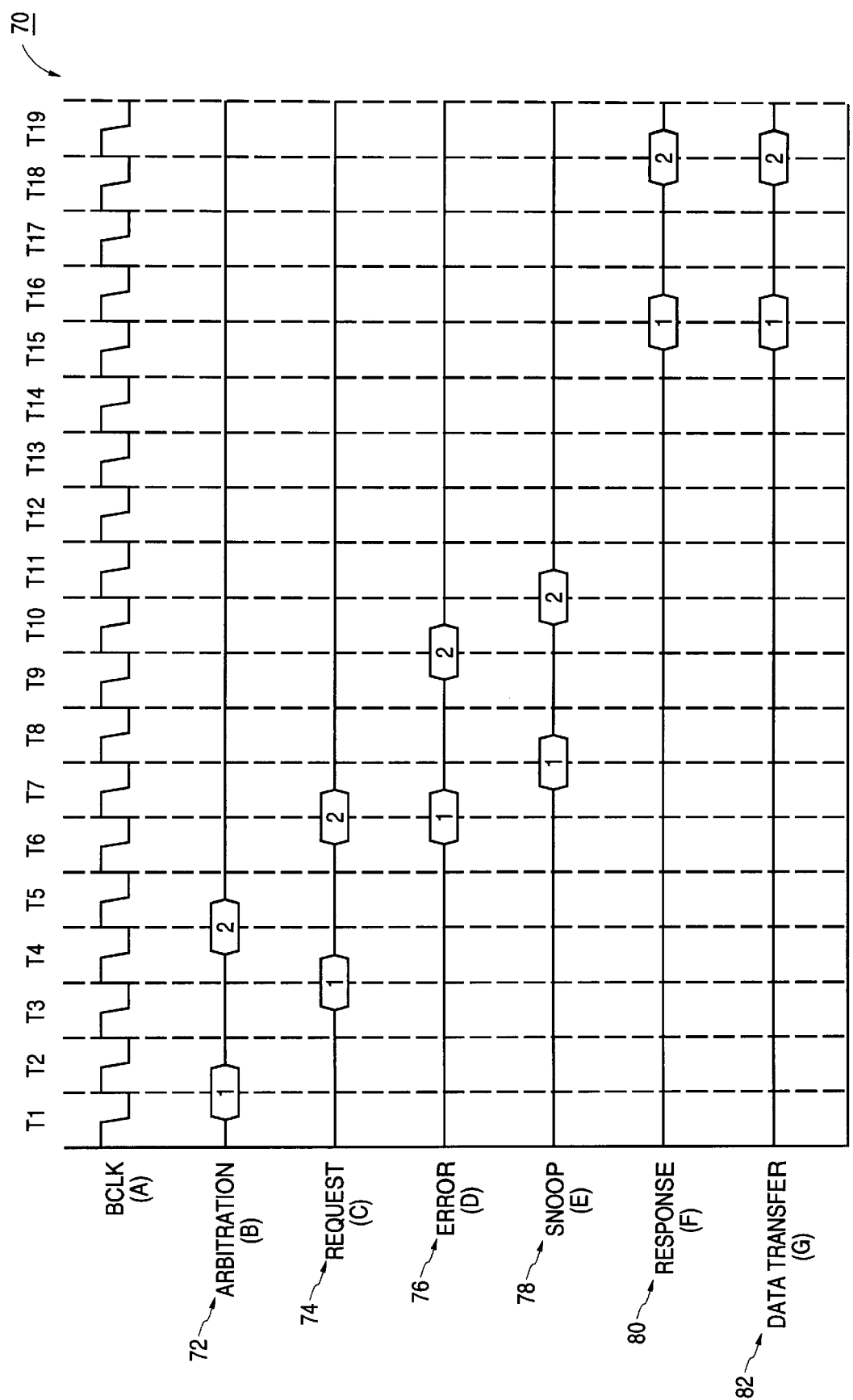
FIG. 3 is a timing diagram illustrating six phases that may be included within an external bus transaction.

FIG. 2 is a block diagram providing a simplified representation of the external bus 14 which is shown to couple a processor 12 and a further external bus agent 21, which may be a further processor or any other device coupled to the external bus 14. The external bus 14 is compliant with the external bus specification for the Pentium Pro® or Pentium II® processors, in which case the external bus 14 includes a 36-bit address bus 14a, a 64-bit data bus 14b, and control signals 14c. The processor 12 and the external bus agent 21 each include external bus logic (EBL) 60 that is further described in U.S. Pat. No. 5,535,345 (Fisch et al.), which is incorporated herein by reference. The external bus logic 60 included in the processor 12 and the agent 21 provides the physical and logical interface between the respective device and the external bus so as to enable external bus transactions to occur over the external bus 14. For the purposes of this specification, the term "transaction" is defined as a bus activity related to a single bus access request. A transaction may begin with bus arbitration, and the assertion of a signal ADS# and the propagation of a transaction address. A transaction, as defined by Intel Architecture (IA) specifications, may include up to six phases, each phase using a specific set of signals to communicate a particular type of information. FIG. 3 is a timing diagram illustrating six transaction phases for two transactions (i.e. transaction 1 and 2). Specifically, each transaction includes the following phases:

1. An arbitration phase 72;
2. A request phase 74;
3. An error phase 76;
4. A snoop phase 78;
5. A response phase 80; and
6. A data transfer phase 82.

As is apparent from FIG. 3, bus transactions are pipelined in that the various phases of each of the transactions overlap. When a requesting agent does not own the bus, a transaction begins with the arbitration phase 72 in which the requesting agent (e.g. the processor 12 or the external bus agent 21) becomes the bus owner. Thereafter, the transaction enters the request phase 74, where the bus owner drives request and address information on the bus. The above-described phases are, of course, merely exemplary. Any one of the phases (e.g., the error phase 761) may be omitted from a transaction.

Figure 4:
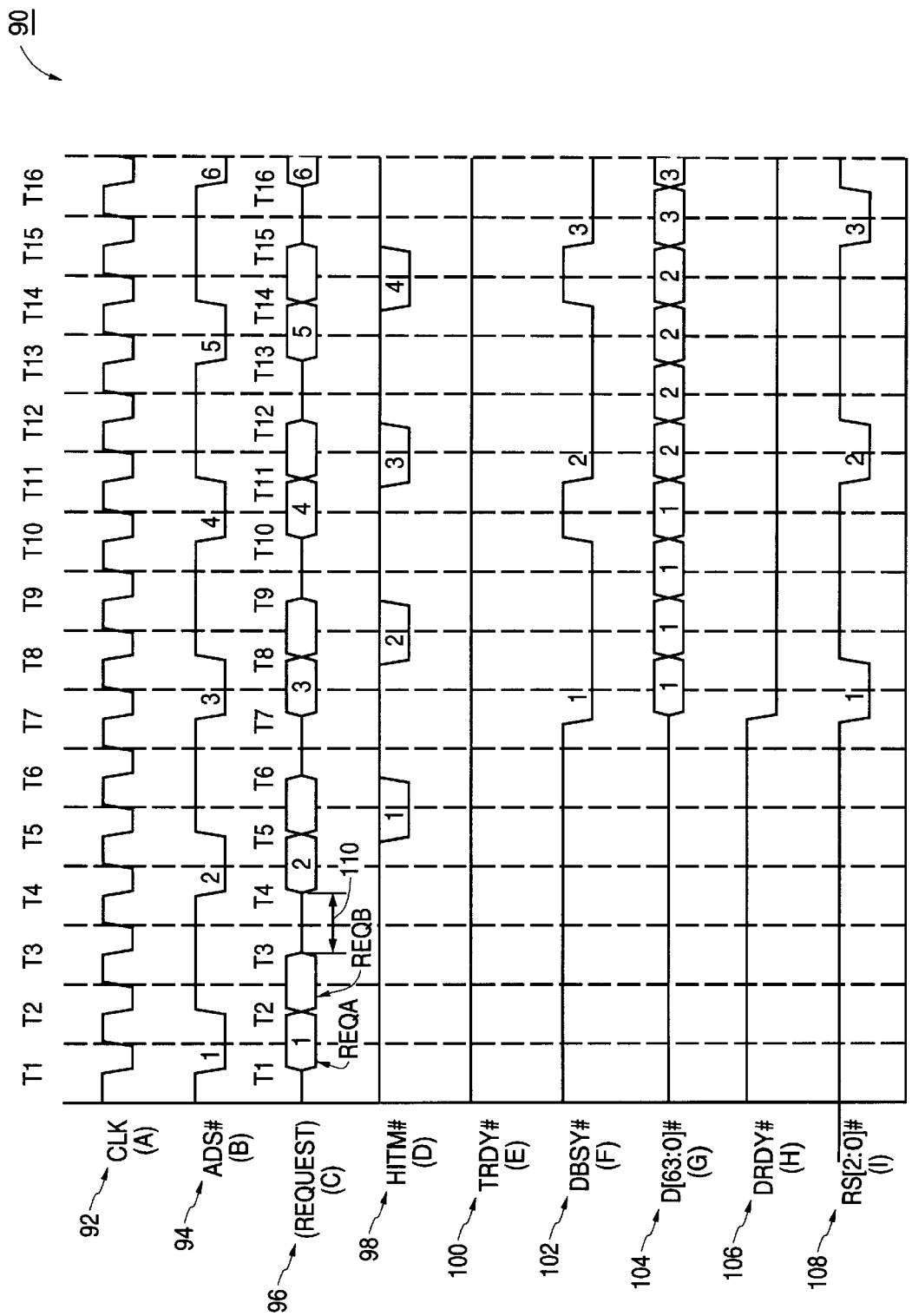
FIG. 4 is a timing diagram showing signal transitions for a back-to-back read line transaction on exemplary external bus.

Specific reference is now made to FIG. 4, which illustrates a timing diagram 90 showing signal transitions for a full speed back-to-back read line transaction within an exemplary external bus 14. The signals illustrated in the timing diagram 90 include a clock (CLK) signal 92, an address strobe (ADS#) signal 94, request signals 96, a hit to a modified cache line (HIT#) signal 98, a target ready (TRDY#) signal 100, a data bus busy (DBSY#) signal 102, a data (D[63:0]#) signal 104, a data ready (DRDY#) signal 108 and a response status (RS[2:0]#) signal 108.

The request phase 74 illustrated in FIG. 3 is two clock cycles in duration as illustrated by the transitions of the request signals 96 in FIG. 4. In a first clock (e.g., T1) of the request phase 74, the ADS# signal 94 is driven low, and transaction address information (i.e. the request signal 96) is placed on the address bus 14a. This is indicated as request phase A (REQA). In a second clock (e.g., T2) further information is placed on the address bus 14a. Such further information may include byte enable information, deferred ID information and information concerning the length of the relevant transaction. This is indicated as request phase B (REQB).

The error phase 76 indicates any parity errors triggered by the request. Every transaction that is not canceled because an error was indicated in the error phase 76 includes a snoop phase 78, which occurs four or more clocks after the request phase 74 begins. The results generated within the snoop phase 78 are reported back to the external bus logic 60 and indicate if the address driven for the transaction references a valid or modified (dirty) cache line in any bus agent cache.

The snoop phase 78 also indicates whether a transaction is likely to be completed in order with respect to previously issued transactions, be canceled and retried later, or be deferred for possible out-of-order completion when coupled to a processor that allows out-of-order completion of transaction requests on the bus. The HIT# signal 98 is driven low to indicate that a transaction references a modified cache line in a bus agent's cache.

In the response phase 80 external bus agents report to the external bus logic 60 information indicating whether the transaction has succeeded or failed, whether the transaction is guaranteed to complete in order, whether the transaction's completion must be temporarily deferred, whether the transaction will be retried and whether the transaction contains the data transfer phase 82. If the transaction does include the data transfer phase 82 (i.e., the requesting agent has write data to transfer, or has requested read data), the transactions enters the data transfer phase 82.

Referring again to FIG. 4, during a full speed back-to-back read line transaction, a chunk (i.e., 64 bits) of data is transferred during each of four consecutive clock periods (i.e., T7–T11).

From FIG. 4 it is apparent that a two clock request phase 74 generates a four-clock data transfer phase 82 during full speed read line transactions, which occur regularly within computer systems. Accordingly the address bus is being under-utilized and bandwidth waste occurs between request phases, as indicated at 110 in FIG. 4.

Multiplexed Address and Data Bus

Figure 5:
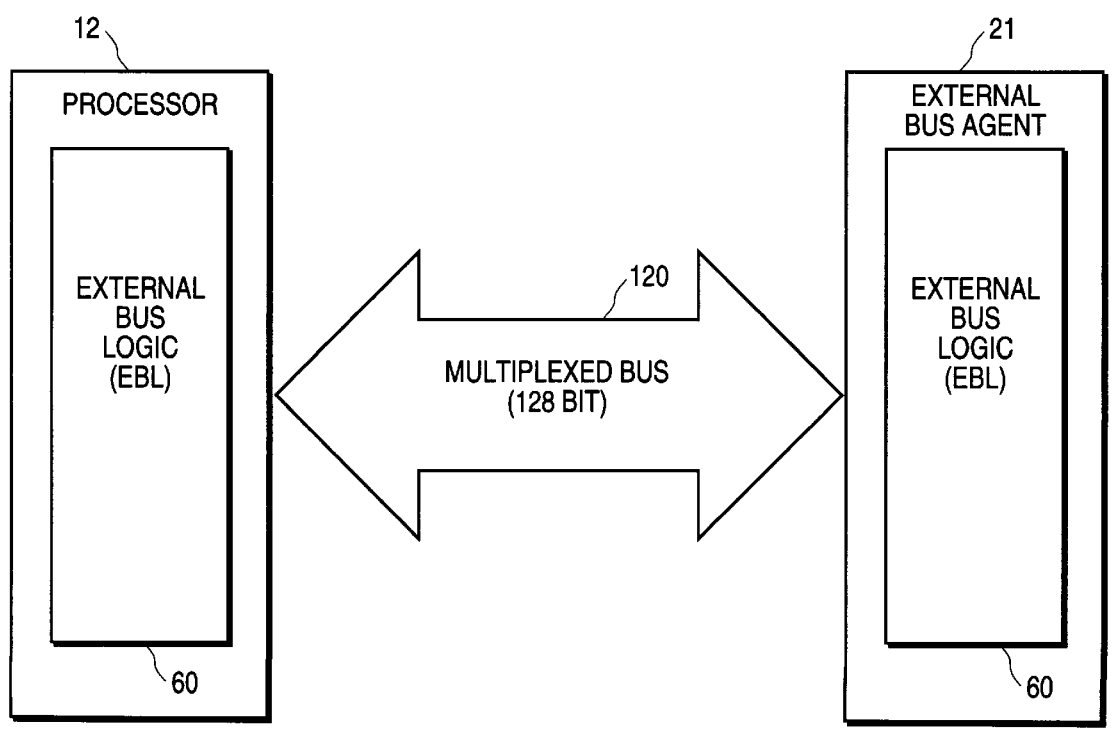
FIG. 5 is a block diagram illustrating an adaptive, multiplexed 128-bit bus, according to one embodiment of the invention, coupling a processor and an external bus each including external bus logic, also according to one embodiment of the present invention.

Referring to FIG. 5, a pair of external bus agents in the form of a processor 12 and an external bus agent 21 are shown to be coupled via a multiplexed address and data bus 120, constructed according to an exemplary embodiment of the present invention. The multiplexed bus 120 is a 128-bit bus. However, the teachings of the present invention are equally applicable to buses of other sizes, including 32, 64 and 256 bit buses. The processor 12 and the external bus agent 21 each include external bus logic (EBL) 60, according to one embodiment of the present invention, that facilitates communication by the respective processor 12 and the bus agent 21 over the multiplexed bus 120. The present invention proposes replacing an external bus, such as the bus 14 shown in FIG. 2, that includes an address bus, a data bus and control signals, with a time-multiplexed bus, such as the multiplexed bus 120 shown in FIG. 5, where the entire 128 bits of the multiplexed bus 120 are substantially dedicated to a particular function at any moment in time. Accordingly, in contradistinction with the bus 14 where each bit of the bus 14 is dedicated to carrying a predetermined data type, some or all of the bits of the multiplexed bus 120 may carry different information types (i.e., address, data or control information) at different times. Specifically, by time multiplexing the multiplexed bus 120 to carry address or data information in an adaptive or intelligent manner, the present invention seeks to address the under-utilization of a dedicated address bus 14a, as explained above with reference to FIG. 4.

Figure 6:
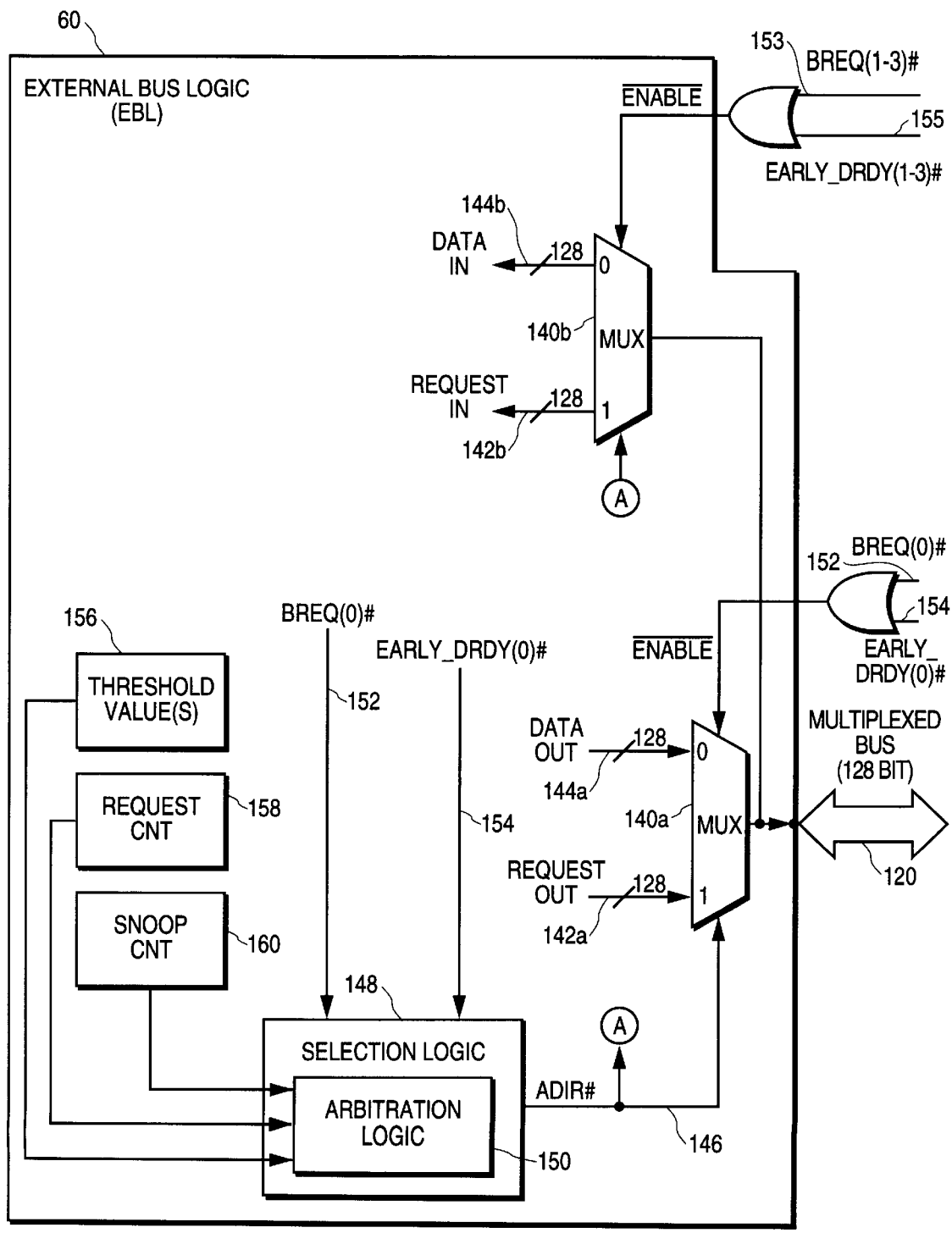
FIG. 6 is a block diagram showing circuitry, according to one exemplary embodiment of the present invention, which may be incorporated within the external bus logic shown in FIG. 5.

FIG. 6 illustrates a block diagram showing circuitry which may, according to one exemplary embodiment of the present invention, be incorporated within the external bus logic 60 to time-multiplex the functionality of the multiplexed bus 120 in such a manner to reduce under utilization of the bandwidth of the bus 120. The external bus logic 60 may be integrated within any bus agent coupled to an external bus, such as, for example, a processor, bus bridge, controller or any other external bus agent. The external bus logic 60 is shown to include a paired 2-to-1 multiplexers (MUXs) 140a and 140b. The MUX 140a is coupled to receive address and data outputs 142a and 144a, respectively. Each of the address and the data outputs 144a and 142a may utilize the entire bandwidth of the multiplexed bus 120 and may thus, according to one embodiment of the invention, occupy 128 bits. Accordingly, the request signal, including the transaction address, that necessitated a two-clock request phase 74 (i.e., REQA and REQB), as illustrated at 90 in FIG. 4, may be propagated from the external bus logic 60 in a single clock cycle, as these request signals are no longer constrained to an address bus, such as the address bus 14a, shown in FIG. 2 that is only 36 bits in width.

Similarly, during a data transfer phase 82, the external bus logic 60 is no longer limited to transmitting four 64-bit chunks of data during four consecutive clock periods over a 64-bit data bus 14b, as illustrated at 104 in FIG. 4. Specifically, the external bus logic 60 may, according to the invention, propagate the four chunks of data over two consecutive clock cycles. In a similar manner, the MUX 140b allows the external bus logic 60 to receive address and data inputs 144b and 142b transmitted using the entire bandwidth of the multiplexed bus 120.

The MUX 140a is operable to select between the request output 142a and the data output 144a by the assertion and desertion of a selection signal in the form of a direction (ADIR#) signal 146. The direction signal (ADIR#) 146 is asserted and de-asserted by selection logic 148, which includes arbitration logic 150. The selection logic 148 is coupled to receive both a bus request (BREQ#) signal 152 and an early data ready (EARLY_DRDY) signal 154, the assertions of which are interpreted by the selection logic 148 as address and data bus requests respectively.

The BREQ# signal 152 is a symmetric-agent bus master signal, whereby a symmetric external bus agent arbitrates for the external bus. Specifically, in a symmetric agent computer system including four external bus agents, a specific bus agent asserts a BREQ# signal 152 on a dedicated output line, and receives BREQ# signals from the other three agents as inputs. The symmetric agents support bus arbitration based on a round-robin mechanism. A rotating ID is used by the four symmetric bus agents to track the agent with the lowest priority at the next arbitration event. An arbitration event occurs when one of the symmetric bus agents asserts its BREQ# signal 152 on an idle bus, or a current bus owner de-asserts its BREQ# signal 152 to release bus ownership to a new bus owner. The BREQ# signal 152 received by the selection logic 148 as illustrated in FIG. 5 is the output BREQ# signal 152 of a bus agent within which the relevant external bus logic 60 is incorporated. Accordingly, the assertion of the BREQ# signal 152 allows the selection logic 148 to determine not only that an associated bus agent requires control of the external multiplexed bus 120, but also that following the arbitration phase 72 of a transaction, a request phase 74 (in which address information will be placed on the external multiplexed bus 120) is required. According to one embodiment of the present invention, the assertion of the BREQ# signal 152 is interpreted by the selection logic 148 as an address bus access request.

The EARLY_DRDY signal 154 is an early data-ready signal that may be asserted by a bus agent within which the external bus logic 60 is incorporated, and indicates that the bus agent wishes to place valid data on the external multiplexed bus 120. The assertion of the EARLY_DRDY signal 154 indicates that a bus agent wishes to enter the data transfer phase 82 of a transaction. According to one embodiment of the present invention, the assertion of the EARLY_DRDY signal 154 is interpreted by the selection logic 148 as a data bus access request.

Each of the MUXs 140*a* and 140*b* the is also shown to have an ENABLE input, via which the respective MUX may either the enabled or disabled. The "output" MUX 140*a* is shown to be enabled by the assertion of the BREQ# signal 152 or the EARLY_DRDY signal 154, which assertions indicate that the device that includes the external bus logic 60 wishes to issue a data output or a request output. On the other hand, the "input" MUX 140*b* is enabled by the assertion of a BREQ# signal 153 or a EARLY_DRDY signal 155 associated with another device having access to the multiplexed bus 120, the assertion of either the signal 153 or 155 indicating that such other device wishes to issue a request or data output, that may comprise an input to the device including the external bus logic 60. By monitoring the signals 152 and 154, the selection logic 148 is thus able to detect when a bus agent associated with the external bus logic 60 requires access to the multiplexed bus 120, and whether the purpose of this access is to execute a request phase or a data transfer phase of a transaction (i.e. servicing an address or data access request).

In the event that either an address or data bus access request is detected by assertion of either the BREQ# signal 152 or the EARLY_DRDY signal 154, and no contention arises between such an access request and an access request of the opposite type (i.e., contention between an address bus request and a data bus request), then the selection logic 148 simply grants the multiplexed bus 120 to the relevant access request. Specifically, the selection logic 148 grants the multiplexed bus 120 to a request output 142*a* and request input 142*b*, in response to the assertion of the BREQ# signal 152, by de-asserting the ADIR# signal 146 (i.e., by driving the ADIR# signal 146 high). Alternatively, the selection logic 148 grants the multiplexed bus 120 to a data output 144*a*, or to data input 144*b* in response to the assertion of the EARLY_DRDY signal 154, by asserting the ADIR# signal 146 (i.e., by driving the ADIR# signal 146 low).

On the other hand, should contention arise between address and data bus access requests, the arbitration logic 150 operates to arbitrate between these contending bus access requests. Contention between address and data bus access requests may occur when, for example, the BREQ# signal 152 and the EARLY_DRDY signal 154 are simultaneously asserted or when there is an outstanding bus access request of one type and a bus access request of the opposite type is received prior to servicing of the pending request. If a bus transaction (either data or address) is occurring at the time the contention arises, the arbitration logic should allow the transaction to complete before undertaking the arbitration operation.

The arbitration logic 150 is shown to be coupled to three registers, namely a threshold value register 156, a request count register 158 and a snoop count register 160. The request count register 158 maintains an internal request count (e.g., the "RCNT" value maintained by IA architecture processors) to track the number of transactions outstanding on the multiplexed bus 120. The internal request count is incremented by one when a new transaction, originating at any bus agent, enters a request phase 74. The internal request count is further decremented by one when an outstanding transaction completes the response phase 80, or is aborted in the error phase 76. In one embodiment, the internal request count is also initialized to 0 during reset and bus initialization, and may be a value from 0 to 7, this being the maximum of number of transactions outstanding on the multiplexed bus 120.

The snoop count register 160 maintains an internal snoop count (e.g., the "SCNT" value maintained by IA processors) to track the number of outstanding transactions on the multiplexed bus 120 that still need to complete the snoop phase 78. The internal snoop count is incremented by one when a new transaction enters the request phase 74, and is decremented by one when an outstanding transaction completes the snoop phase 78, or is aborted in the error phase 76. In one embodiment, the internal snoop count is also initialized to 0 during reset and bus initialization, and may range in value from 0 to 7.

The threshold value register 156 stores one or more threshold values that are compared to the internal request count and snoop count values stored in the request count and snoop count registers 158 and 160 by the arbitration logic 150 for the purpose of arbitrating between contending address and data bus access requests. In one embodiment of the present invention, the arbitration logic 150 may compare the request count value (i.e., the number of outstanding data transactions on the multiplexed bus) to a data threshold number maintained within the threshold value register 156. If the number of outstanding data transactions on the multiplexed bus exceeds the data threshold number, then a data bus access request wins the arbitration event. In a further embodiment of the present invention, the arbitration logic 150 may compare the internal snoop count maintained within the snoop count register 160 (i.e., the number of outstanding snoop transactions on the multiplexed bus 120) to a snoop threshold number maintained within the threshold value register 156. Should the number of outstanding snoop transactions exceed the snoop threshold number, then a data bus access request again wins the arbitration event. It will readily be appreciated that many other arbitration schemes using various permutations and combinations of the internal request count and internal snoop count may be used to arbitrate between contending address and data bus access requests.

While the registers 156, 158 and 160 are shown to reside separately from the arbitration logic 150, any or all of these registers may be incorporated within the arbitration logic 150.

The threshold value register 156 is furthermore programmable, so that threshold values stored therein (e.g., the data threshold number or the snoop threshold number) are dynamically programmable. For example, threshold values maintained within the threshold value register 156 may be set by either an operating system or an application program of a computer system within which the external bus logic 60 is operational. For example, a certain application program may wish to give priority to data bus access requests, in which case the application program may access the threshold value register 156 and store therein a low data threshold number. Further, threshold numbers stored within the register 156 may be dynamically alterable or programmable during execution of an application program. For example, an application program may alter one or more threshold values stored within the register 156 based on various other parameters monitored by the application program during execution.

In an alternative embodiment, the arbitration logic 150 may employ a "static" arbitration scheme, wherein a pending access request or one request type (i.e., either a pending data or address request) is always granted access in performance over another request type. In this case, the request count and snoop count values are ignored, and play no part in the arbitration process.

In a further embodiment of the present invention, the external bus logic 60 facilitates full compatibility with legacy buses (such as, for example, the Pentium Pro® bus) by allowing selective disablement of the selection logic 148, in which access to the bus 120 is not provided via the MUXs 140 and 140b, but rather via an interface employed within the Pentium Pro®.

Figure 7:
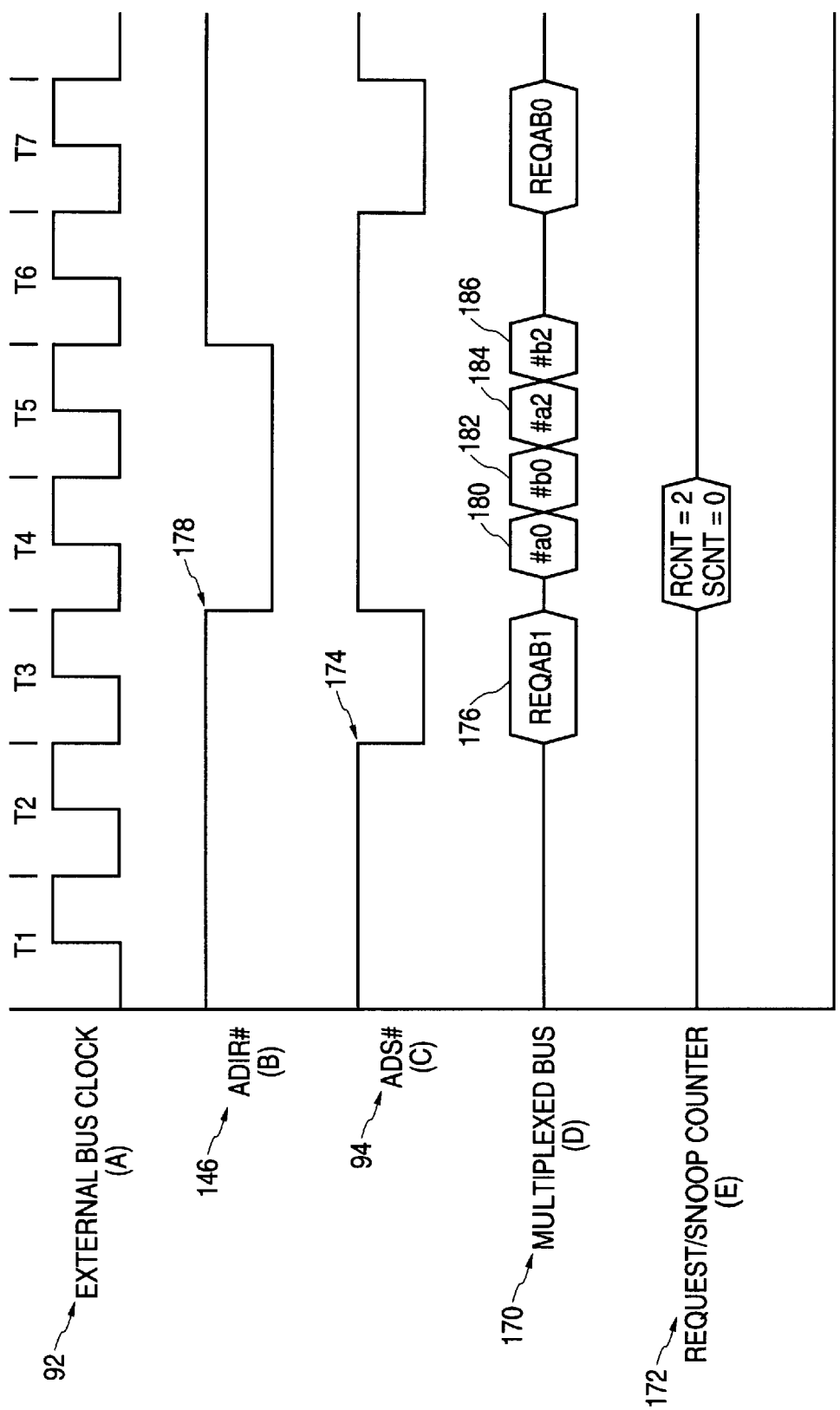
FIG. 7 is a timing diagram illustrating transitions, according to one exemplary embodiment of the present invention, of signals within the external bus logic and on a multiplexed bus.

FIG. 7 is a timing diagram illustrating transitions, according to one embodiment of the present invention, of signals within the external bus logic 60 and the multiplexed bus 120 shown in FIG. 5 in a multiprocessor (MP) system. Specifically, FIG. 7 illustrates an external bus clock signal 92, the direction (ADIR#) signal 146, the address strobe (ADS#) signal 94, multiplexed bus signals 170 and internal request and snoop count signals 172.

As indicated at 174, the assertion, as shown in FIG. 3, of the ADS# signal 94 defines the beginning of a request phase 74 of a transaction, in response to which the external bus logic 60 is able simultaneously to issue two "sets" of request signals (i.e. REQAB1) on the multiplexed bus 120, as indicated at 176. The ability of the external bus logic 60 simultaneously to issue two "sets" of request signals is possible as the full 128-bit bandwidth of the multiplexed bus 120 is available for request signals during the request phase 74. It will further be noted that the ADIR# signal 146 is not asserted (i.e., is high) during the request phase 74. Referring back to FIG. 6, it will be appreciated that the request output 142a is accordingly selected by the MUX 140a for propagation on the multiplexed bus 120. At the beginning of clock cycle T4, the selection logic 148 asserts the ADIR# signal 146, as indicated at 178, the assertion of this signal indicating commencement of the data transfer phase 82. The ADS# signal 94 is accordingly de-asserted at this time. Referring again to FIG. 6, the assertion of the ADIR# signal 146 causes the MUX 140 to select the data input 144 for propagation of the multiplexed bus 120.

Following the issuance of the two "sets" of request signals (i.e., REQAB1) on the multiplexed bus 120, as indicated 176, a data response (not necessarily responsive to the request indicated at 176) in the form of a first 128-bit chunk may be placed on the multiplexed bus 120, as shown at 180 during a half clock. At 182, a second 128-bit chunk is similarly transmitted on the multiplexed bus 120. The data responses indicated at 180 and 182 may be issued responsive to a previous transaction issued by a first device coupled to the multiplexed bus 120. At 184 and 186, two further data responses in the form of 128-bit chunks are propagated on the multiplexed bus 120 responsive to a previous transaction issued by a second device, for example a processor, coupled to the multiplexed bus. In a similar manner, two 128-bit chunks (not shown), comprising the data response to the request indicated at 176, may be propagated on the multiplexed bus 120 at some later time. The data responses indicated at 180–186 are responsive to earlier requests (not shown), similar to the request 176, placed on the multiplexed bus 120 by a single, or two distinct, devices coupled to the multiplexed bus 120.

It will furthermore be noted that the "RCNT" internal request count value is shown to be "2" following the issuance of the request at 176, this indicating that two transactions are currently outstanding on the multiplexed bus 120.

As the full 128-bit bandwidth of the multiplexed bus 120 is available during both the request phase 74 and the data transfer phase 82, the present invention allows the request phase 74 to be shortened to a single clock period, as opposed to two clock periods in the external bus protocol employed by the Pentium Pro microprocessor. The data transfer phase 82 is shortened to two consecutive clock periods, as opposed to four consecutive clock periods within the Pentium Pro® external bus protocol. While time multiplexing the request and data phases on a single bus reduces the parallelism (and pipe depth) of the external bus employed by the Pentium Pro® microprocessor, it is believed that the present invention results in an increased bus throughput, particularly in architectures where full speed transactions predominate.

The multiplexed bus 120 may achieve compatibility with the external bus protocol of the Pentium Pro processor by assigning lines [A 3 . . . A 36] to lines [AD0 . . . AD31] of the multiplexed bus. Further, request lines [REQ0 . . . 4] may be assigned to lines [AD32 . . . AD36], and data lines [D0 . . . D64] may be assigned to lines [AD64 . . . AD127]. The MUX 140 would in this scenario accept inputs only from the request output 142a, while the data output 144a would be disabled. Further, the ADIR# signal 146 would be disabled, and addresses issued as 32-bit double words. Thus, a conventional Pentium Pro® bus transaction could be issued over the multiplexed bus 120. Such compatibility would furthermore have to be configured at power-on/reset, as chipset and peripheral notification regarding the configuration of the multiplexed bus 120 would have to occur.

Figure 8:
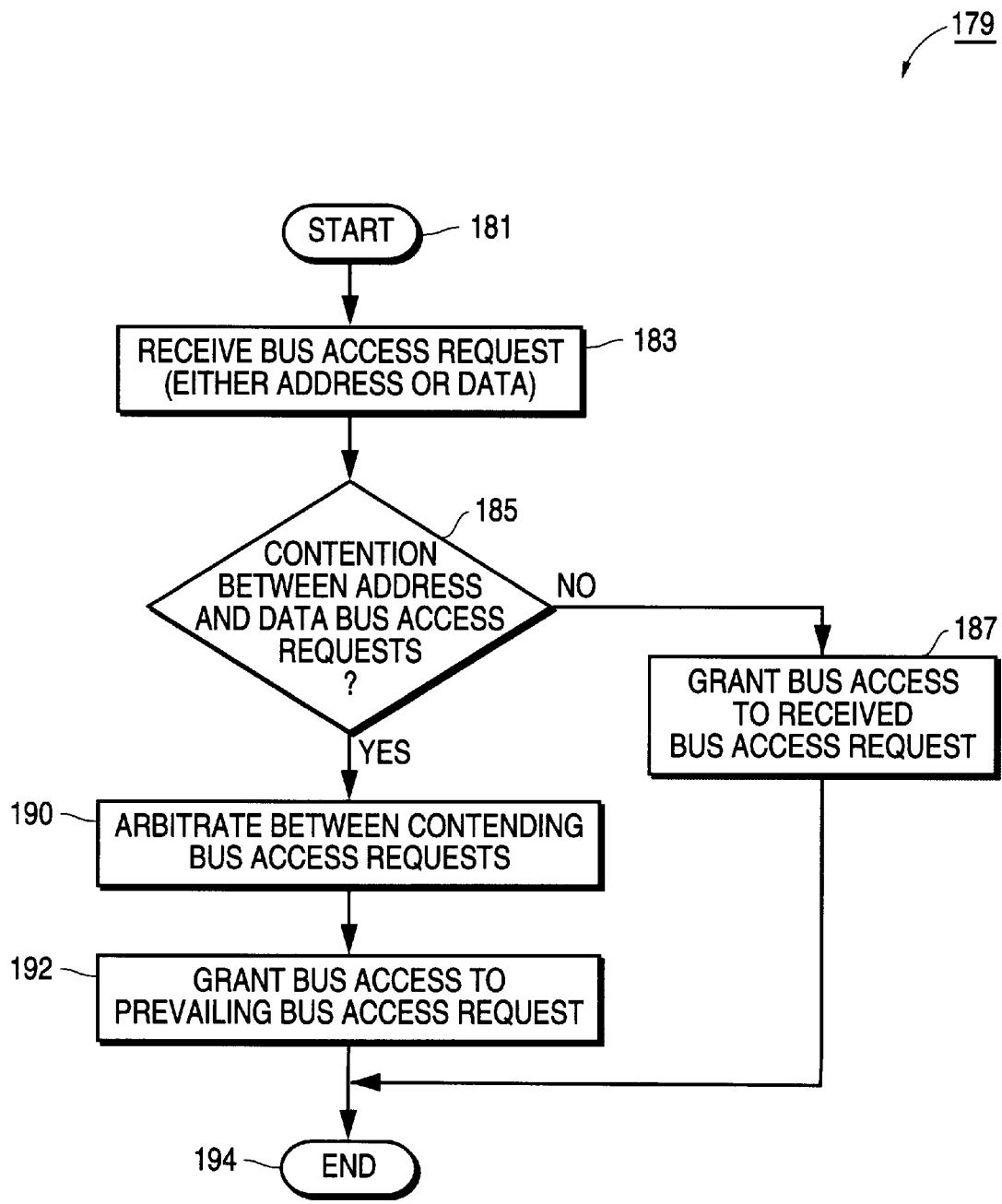
FIG. 8 is a flow chart illustrating a method, according to one exemplary embodiment of the present invention, of operating a multiplexed address and data bus within a computer system.

FIG. 8 is a flow chart illustrating a method 179, according to one embodiment of the invention, of operating a multiplexed address and data bus 120 within a computer system. The method 179 commences at 181, and proceeds to step 183, where a multiplexed bus access request (i.e. either an address or data bus access request) is received. In one embodiment of the invention, the reception of a bus access request is ascertained by detecting assertion of either the BREQ# signal 152 or the EARLY_DRDY signal 154 by the selection logic 148. At decision box 185, a determination is made as to whether contention exists between the bus access request received at step 183 and any further pending or simultaneously received bus access requests of the opposite type. In one embodiment, the selection logic 148 may determine whether contention exists between address and data bus access requests. If not, the method 179 proceeds to step 187, where access to the multiplexed bus 120 is granted to the bus access request received at step 183. Specifically, the selection logic 148 may grant access to the multiplexed bus 120 to either the request output 142a or the data output 144a by asserting or de-asserting the ADIR# signal 146.

On the other hand, should it transpire at decision box 185 that contention exists between pending address and data bus access requests, the method 179 proceeds to step 190, where an arbitration scheme is implemented to arbitrate between the contending bus access requests. Specifically, the arbitration logic 150 arbitrates according to one of a number of schemes to determine which of the contending address and data bus access requests should be granted priority. At step 192, access to the multiplexed bus 120 is granted to the prevailing bus access request. Specifically, the selection logic 148 may assert or de-assert the ADIR# signal 146 in accordance with the outcome of the arbitration scheme. The method 179 then terminates at step 194.

It should be noted that the method 179 is not implemented during active data or address transfer, and the ADIR# signal may not be asserted or de-asserted during a data or address transaction. The method 179 is performed "request" activity (e.g., the request phase 74) that may only be one clock cycle in duration to determine the owner of the bus 120 during the next clock cycle.

Figure 9A:
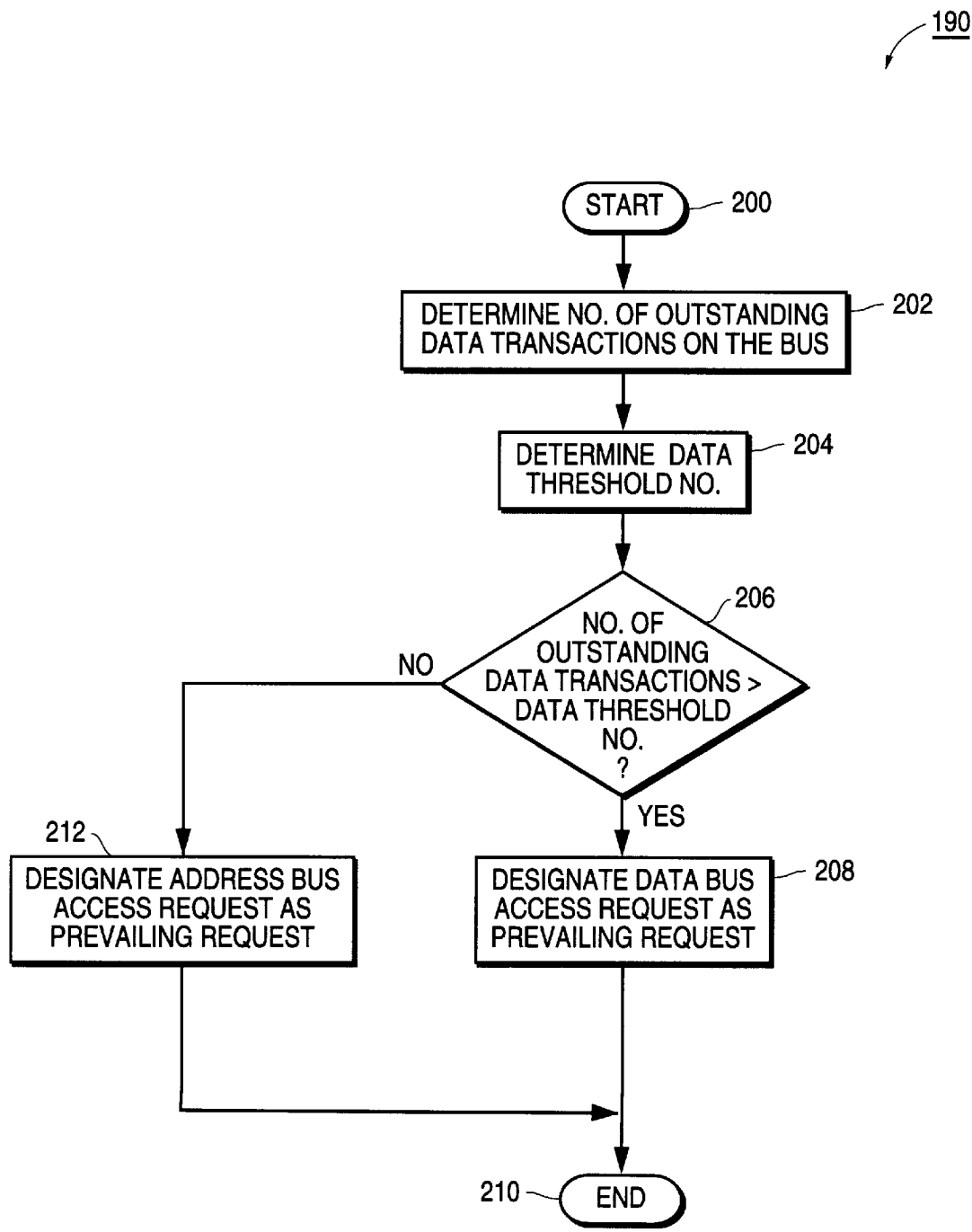
FIGS. 9A–9C are flow charts illustrating three exemplary arbitration schemes, accordingly to respective exemplary embodiments of the present invention, that may be utilized within the method illustrated in FIG. 8.
Figure 9B:
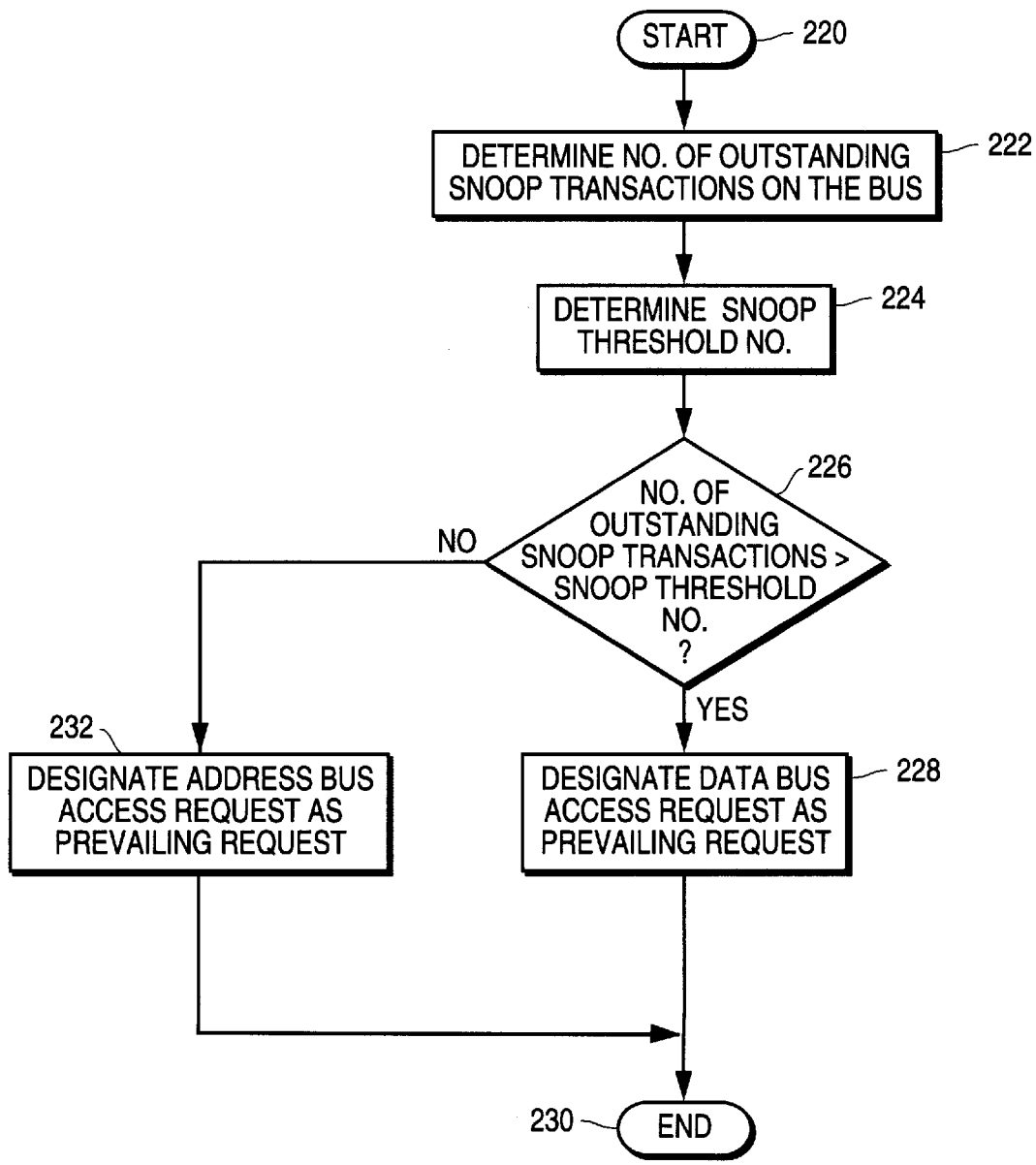
Figure 9C:
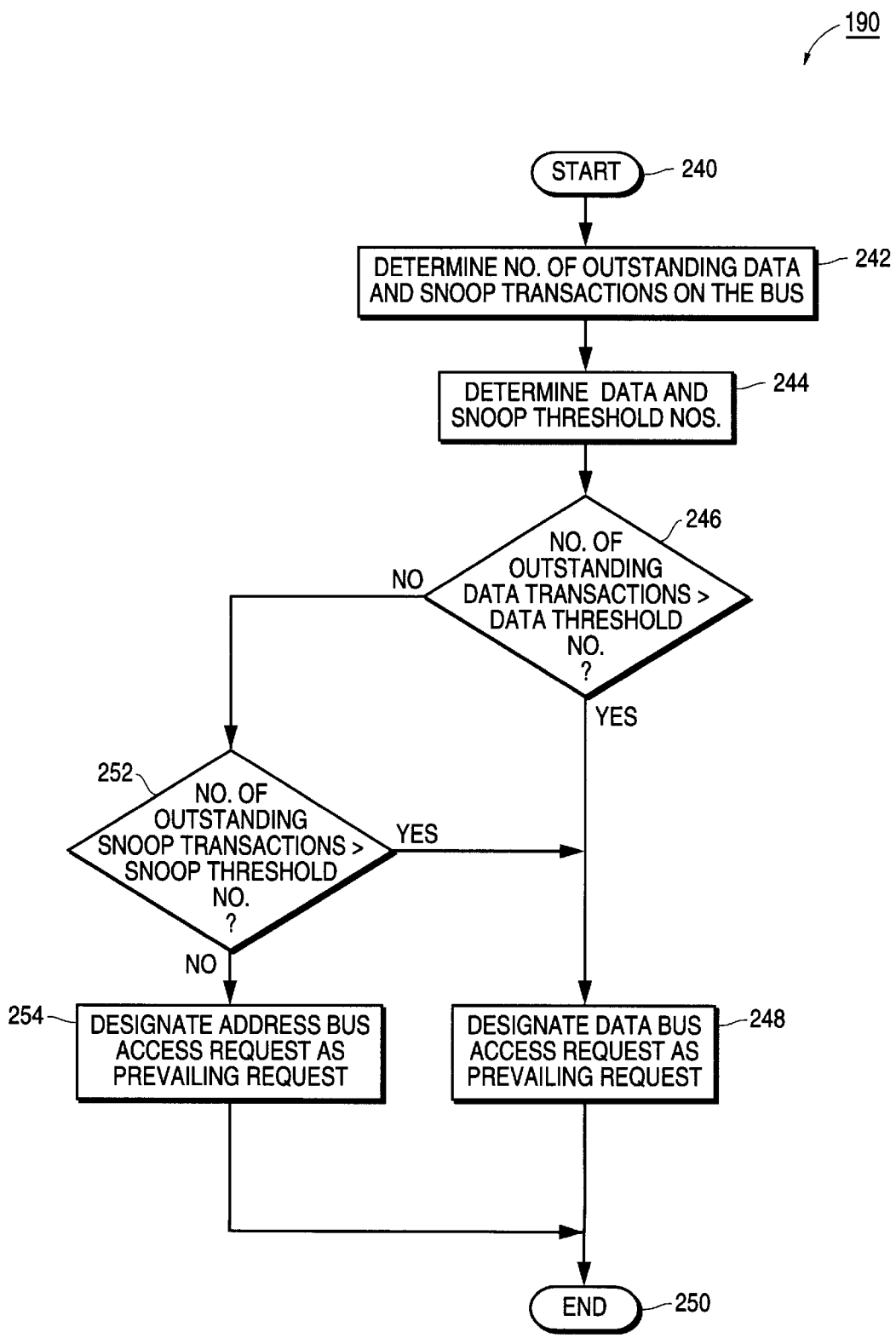

FIGS. 9A–9C are flow charts illustrating three exemplary adaptive arbitration schemes that may be employed at step 190 within the method 179 illustrated in FIG. 8. Of course, static arbitration could also be employed. Referring firstly to FIG. 9A, the arbitration scheme 190 commences at step 200, and then proceeds to step 202 where a determination is made of the number of outstanding data transactions on the external multiplexed bus 120. In one embodiment, the arbitration logic 150 reads the internal request count maintained within the request count register 158 to determine the number of outstanding data transactions.

At step 204, a data threshold number is determined. In one embodiment, the arbitration logic 150 may read a data threshold number maintained within the threshold value register 156. As mentioned above, this data threshold number may be dynamically altered, for example by an operating system or application program executing within the computer system.

At decision box 206, a determination is made by the arbitration logic 150 whether the number of outstanding data transactions exceeds the data threshold number. If so, this indicates that a backup of data transactions has occurred, and that preference should now be given to data transactions so as to clear this backup. Accordingly, the arbitration scheme 190, in this case, proceeds to step 208 wherein a contending data bus access request is designated as the prevailing bus access request. The method then terminates at step 210.

On the other hand, should it transpire at decision box 206 that the number of outstanding data transactions (e.g., RCNT) does not exceed the data threshold number, the arbitration scheme 190 proceeds to step 212, where a contending address bus access request is designated as the prevailing request. The arbitration scheme 190 then proceeds from step 212 to step 210.

FIG. 9B illustrates an alternative arbitration scheme 190 that corresponds substantially to the scheme illustrated in FIG. 9A, but differs in that a number of outstanding snoop transactions is determined and compared to a snoop threshold number to determine which one of a pair of contending address and data bus access requests is designated as a prevailing request.

FIG. 9C illustrates a further embodiment of an arbitration scheme 190 that essentially comprises a combination of the arbitration schemes illustrated in FIGS. 9A and 9B. From step 240, the arbitration scheme 190 proceeds to step 242 where a determination of both the number of outstanding data and snoop transactions on the multiplexed bus is made. Thereafter, at step 244, both data and snoop threshold numbers are determined. At decision box 246, a first determination is made as to whether the number of outstanding data transactions exceeds the data threshold number. If so, the method proceeds to step 248, where a contending data bus access request is designated as the prevailing request.

On the other hand, should it be determined at decision box 246 that the number of outstanding data transactions does not exceed the data threshold number, the arbitration scheme 190 proceeds to decision box 252, where a determination is made as to whether the number of outstanding snoop transactions exceeds the snoop transaction threshold number. If so, the arbitration scheme 190 again proceeds to step 248, wherein the contending data bus access request is designated as the prevailing request. On the other hand, should the number of outstanding snoop transactions not exceed the snoop threshold number, the arbitration scheme 190 proceeds from decision box 252 to step 254 wherein a contending address bus access request is designated as the prevailing request. The arbitration scheme 190 then terminates at step 50.

The arbitration scheme 190 illustrated in FIG. 9C permits a higher degree of tuning and customization of the arbitration scheme by, for example, an application program so as to optimize the external multiplexed bus 120 output for the relevant application. The "tuning" of the arbitration scheme 190 is performed by setting data and/or snoop threshold numbers that are optimized for the relevant application program.

The invention extends to further arbitration schemes, where either a data or address request is recognized as a prevailing request as a default outcome of the arbitration scheme. In these schemes, other factors (e.g., the number of outstanding bus transactions) are not considered.

The arbitration logic 150 may furthermore be capable of implementing any one or more of the arbitration schemes discussed above, and be programmable to select between a number of arbitration schemes that may be implemented. The selection of the arbitration scheme employed by the arbitration logic 150 may be made by an operating system or application program resident within a computer system.

While the present invention has been described as being implemented with respect to an external bus, the teachings of the present invention may also be applied to a back-side bus between a processor and a cache.

Thus, a method and apparatus for operating a multiplexed address and data bus within a computer system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of operating a multiplexed address and data bus within a computer system, the method including:
   arbitrating between an address request and a data request contending for access to the multiplexed address and data bus according to a predetermined criteria; and
   granting the multiplexed address and data bus to either the address or the data request in accordance with the outcome of the arbitration.

2. The method of claim 1 wherein the arbitrating comprises determining whether a number of outstanding data transactions on the multiplexed address and data bus exceeds a predetermined threshold.

3. The method of claim 1 wherein the arbitrating comprises determining whether a number of outstanding snoop transactions on the multiplexed address and data bus exceeds a predetermined threshold.

4. The method of claim 1 wherein the arbitrating comprises recognizing the data request as a prevailing request in the arbitration without consideration of other factors.

5. The method of claim 1 wherein the arbitrating comprises recognizing the address request as a prevailing request in the arbitration without consideration of other factors.

6. The method of claim 1 including modifying the predetermined criteria.

7. The method of claim 6 wherein the predetermined criteria is modified by an operating system operating within the computer system.

8. The method of claim 6 wherein the predetermined criteria is modified by an application program being executed within the computer system.

9. The method of claim 6 including modifying a threshold number against which a number of outstanding transactions on the multiplexed address and data bus is compared during the arbitration.

10. A bus interface to be coupled to a multiplexed address and data bus within a computer system, the bus interface comprising:

arbitration logic to arbitrate between an address request and a data request, contending for access to the multiplexed address and data bus, according to a predetermined criteria; and selection logic to grant the multiplexed address and data bus to either the address or the data request in accordance with the outcome of the arbitration.

11. The bus interface of claim 10 wherein the arbitration logic is configurable to arbitrate between the address request and the data request according to any one of a plurality of arbitration schemes.

12. The bus interface of claim 11 wherein the arbitration logic is configurable by an operating system and/or an application program of the computer system.

13. The bus interface of claim 10 wherein the arbitration logic is to determine a number of outstanding data transactions on the multiplexed address and data bus and a data threshold number, and to determine whether the number of outstanding data transactions on the multiplexed address and data bus exceeds the data threshold number.

14. The bus interface of claim 10 wherein the arbitration is to determine a number of outstanding snoop transactions on the multiplexed address and data bus and a snoop threshold number, and to determine whether the number of outstanding snoop transactions on the multiplexed address and data bus exceeds the snoop threshold number.

15. The bus interface of claim 10 wherein the arbitration is to recognize the data request as a prevailing request in the arbitration without consideration of other factors.

16. The bus interface of claim 10 wherein the arbitration logic is to recognize the address request as a prevailing request in the arbitration without consideration of other factors.

17. The bus interface of claim 10 including a register to store a threshold number accessible by the arbitration logic to arbitrate between the address request and the data request, the threshold number being dynamically alterable.

18. A bus agent to be coupled to a multiplexed address and data bus within a computer system, the bus agent including:

arbitration logic to arbitrate an address request and a data request, contending for access to the multiplexed address and data bus, according to a predetermined criteria; and selection logic to grant the multiplexed address and data bus to either the address or the data request in accordance with the outcome of the arbitration.

19. The bus of claim 18 wherein the arbitration logic is to determine whether a number of outstanding data transactions on the multiplexed address and data bus exceeds a predetermined data threshold number.

20. The bus agent of claim 18 wherein the arbitration logic is to determine whether a number of outstanding snoop transactions on the multiplexed address and data bus exceeds a predetermined snoop threshold number.

21. The bus agent of claim 18 including a first register to store a threshold number accessible by the arbitration logic to arbitrate between the address request and the data request, the threshold number being dynamically alterable.

22. The bus agent of claim 18 including a second register to store a count of outstanding transactions on the multiplexed address and data bus.

23. The bus agent of claim 22 wherein the second register is to store a count of outstanding data transactions on the multiplexed address and data bus.

24. The bus agent of claim 22 wherein the second register is to store a count of outstanding snoop transactions on the multiplexed address and data bus.

25. The bus agent of claim 18 comprising a processor.

26. The bus agent of claim 18 comprising a bus bridge.

27. A bus interface to be coupled to a multiplexed address and data bus within a computer system, the bus interface comprising:

arbitration means for arbitrating between a first type of request and second type of request, contending for access to the multiplexed address and data bus, according to a predetermined criteria; and selection logic to grant the multiplexed address and data bus to either the first or second type of request in accordance with the outcome of the arbitration.

28. A computer system including:

a bus;

a bus agent coupled to the bus, the bus agent including:

arbitration logic to arbitrate between a first request and a second request, contending for access to the bus, according to a predetermined criteria, wherein the first and second requests emanate from the bus agent and are of different request types; and selection logic to grant the bus to either the first request or the second request in accordance with the outcome of the arbitration.

29. The computer system of claim 28 wherein the arbitration logic is to determine whether a number of outstanding transactions on the bus exceeds a predetermined threshold number.

30. The computer system of claim 29 wherein the arbitration logic is to determine whether a number of outstanding transactions of a first type on the bus exceeds a predetermined first threshold number.

31. The computer system of claim 30 wherein the arbitration logic is to determine whether a number of outstanding transactions of a second type on the bus exceeds a predetermined second threshold number.

32. The computer system of claim 18 wherein the bus agent includes a register to store a threshold number accessible by the arbitration logic to arbitrate between the address request and the data request, the threshold number being dynamically alterable by an application program or an operating system resident within the computer system.

33. The computer system of claim 28 wherein the bus agent comprises a processor.

34. The computer system of claim 28 wherein the bus agent comprises a bus bridge.

35. The computer system of claim 28 wherein the bus comprises an external bus.

36. The computer system of claim 28 wherein the bus comprises a backside bus coupling a processor and a cache resource.

* * * * *

UNITED STATES PATENT AND TRADEMARK OFFICE
CERTIFICATE OF CORRECTION

PATENT NO.    : 6,209,053 B1                                    Page 1 of 1
DATED         : March 27, 2001
INVENTOR(S)   : Kurts It is certified that error appears in the above-identified patent and that said Letters Patent is hereby corrected as shown below:

<u>Column 11,</u>
Line 67, delete "50" and replace with -- 250 --.

Signed and Sealed this

Second Day of April, 2002

Attest:

Attesting Officer

JAMES E. ROGAN
Director of the United States Patent and Trademark Office